United States Patent [19]

Stuivenwold et al.

[11] 4,315,428
[45] Feb. 16, 1982

[54] SENSOR FOR DETECTING PARTICLES IN A FLUID FLOW

[75] Inventors: Paulus A. Stuivenwold; Kornelis Van Timmeren, both of Rijswijk, Netherlands

[73] Assignee: Shell Oil Company, Houston, Tex.

[21] Appl. No.: 156,835

[22] Filed: Jun. 5, 1980

[30] Foreign Application Priority Data

Jun. 26, 1979 [GB] United Kingdom ............... 22278/79

[51] Int. Cl.³ .................... E21B 47/10; G01N 15/00
[52] U.S. Cl. ................................... 73/61 R; 73/155; 310/336
[58] Field of Search .................. 73/61 R, 155, 861.18, 73/861.21; 310/336, 337, 338

[56] References Cited

U.S. PATENT DOCUMENTS

| | | |
|---|---|---|
| 2,760,184 | 8/1956 | Beattie . |
| 3,271,672 | 9/1966 | Henderson . |
| 3,563,311 | 2/1971 | Stein ................................ 73/155 X |
| 3,834,227 | 9/1974 | Patterson ............................. 73/155 |
| 3,841,144 | 10/1974 | Baldwin ............................. 73/61 R |
| 3,844,174 | 10/1974 | Chabre ........................... 73/432 PS |
| 3,854,323 | 12/1974 | Hearn et al. ....................... 73/61 R |
| 3,989,965 | 11/1976 | Smith et al. . |
| 4,013,905 | 3/1977 | Breneman et al. ................. 310/336 |
| 4,016,766 | 4/1977 | Morris ............................. 73/517 R |
| 4,065,960 | 1/1978 | Grabendorfer et al. ............. 73/627 |

OTHER PUBLICATIONS

Vriezen, P. B., et al. *Sand Detection in Production Lines,* in Society of Petr. Eng. of AIME, Paper No. SPE 4825, pp. 1–14, May 1974.

*Primary Examiner*—Kyle L. Howell
*Assistant Examiner*—Joseph W. Roskos

[57] ABSTRACT

A sensor for detecting sand grains in a fluid flow comprises a ring-shaped member carrying an acoustic transducer. The ring-shaped member is supported on a rod by clamping means, and material having elastic properties is arranged on the surfaces of the ring-shaped member that contact the rod or the clamping means.

6 Claims, 4 Drawing Figures

SENSOR FOR DETECTING PARTICLES IN A FLUID FLOW

BACKGROUND OF THE INVENTION

The invention relates to a sensor for detecting particles carried by a fluid flow. Detection of particles in a fluid flowing through a conduit is often desirable, in particular when monitoring flows of well fluids such as water and/or oil and/or gas being produced from underground permeable formation layers that are penetrated by wells or boreholes extending from the surface of the earth into the said layers.

The fluids passing out of the formation layers into the wells are transported through the wells to the surface. Often, these fluids carry solid particles such as sand grains that are dragged from the formation layers by the flowing fluid. These particles will damage the production equipment, such as by erosive action, or settle down in parts of the equipment, thereby frequently necessitating cleaning of the equipment. To prevent this, the fluid flow should be monitored in order to allow the operator to take the necessary steps when excessive amounts of sand grains are found to be present in the fluid flow.

A system for monitoring the fluid flow carrying particles has included a sensor in the form of a metal rod that is exposed to the flow of fluid. The particles on impinging against the rod, generate acoustic energy, which energy is detected by an acoustical transducer means (such as a piezo-electric element) cooperating with the rod. The transducer means generates electric signals that are representative of the acoustic energy generated by the particles that have contacted the rod. By gauging or calibrating the system, reference data can be obtained that are representative for the total amount and/or mass of particles that is present in the flow.

Another known sensor for detecting particles in a fluid flow is a liquid filled hollow cylindrical metal body having a piezo-electric element freely suspended in the liquid. The impacts made by the particles on the exterior of the metal wall of the body travel through the liquid in the form of pressure waves to the piezo-electric element, and are subsequently transduced into electric signals that are representative of the acoustic energy generated by the impacts.

The known sensors—although suitable for use under many conditions—are not attractive when impacts of said grains or other particles should be measured at specific areas, or locations, in particular not when these areas or locations are of a small size, or when the sensors are to be used for preferentially detecting those particles that arrive from a predetermined direction with respect to the sensor.

BRIEF SUMMARY OF THE INVENTION

An object of the present invention is a sensor for detecting impacts thereon by particles carried by a flow of fluid, which sensor is adapted to detect particles passing through area "windows" of small dimensions and/or to detect particles that are impacting on the sensor in a particular direction.

Another object of the present invention is a sensor of the above type, which is of rugged construction and can be used in particle detection in flows in a borehole by being lowered in the hole to depth levels at which fluid is entering the hole from producing underground formations, and which construction allows—if desired—the suspension of other logging tools therefrom.

The sensor according to the invention includes a metal ring-shaped member supporting transducer means in acoustic wave contact therewith, a rod provided with a shoulder, clamping means for clamping the ring-shaped member on the rod by exerting an axial force on the rod and the member, and material having elastic properties arranged between the ring-shaped member and the rod, and between the ring-shaped member and the surfaces by which a clamping force is exerted on the ring-shaped member.

The ring-shaped member supporting the transducer means may be clamped on the rod through the intermediary of rings arranged between the ring-shaped member and the shoulder and the clamping means respectively. Material having elastic properties is then arranged between the rings and the rod, and between the rings and the surfaces by which a clamping force is exerted on the rings.

BRIEF DESCRIPTION OF THE DRAWINGS

The invention will be described by way of example in more detail with reference to the drawings, wherein.

PREFERRED EMBODIMENTS

Figure 1:
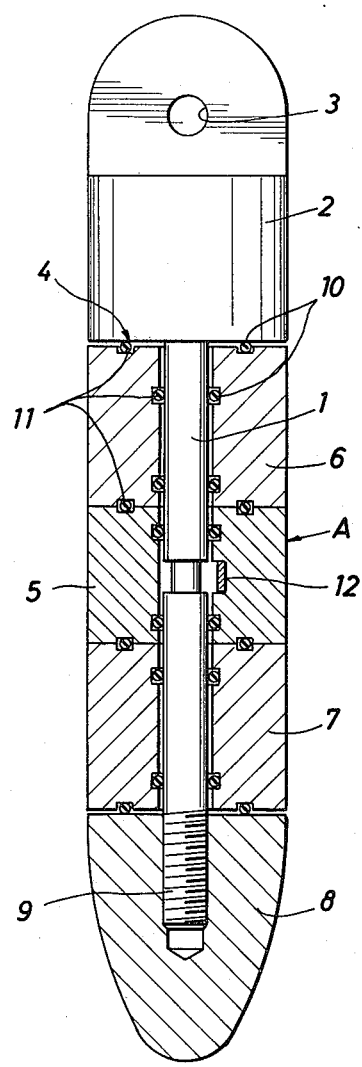
FIG. 1 shows schematically a longitudinal section of a sensor according to the invention that is suitable for being lowered in a borehole.

The sensor shown in FIG. 1 consists of a metal rod 1 provided with a supporting head 2 having an eye 3 suitable for connecting a cable thereto that is designed for lowering the sensor through a borehole to great depth say up to 6000 meters or even more, to detect the presence of sand grains that are transported by fluid flowing out of perforations present in the wall of a casing or other tubular member set in the well or borehole. The head 2 further comprises a shoulder 4 at the lower end thereof.

As assembly consisting of a ring-shaped element 5 and two rings 6 and 7 is clamped on the rod 1 against the head 2 thereof by means of a streamlined nut 8 cooperating with a thread 9 arranged on the lower end of the rod 1.

A plurality of O-rings 10 of elastic material, such as elastic rubber of other suitable material, is arranged in grooves 11 provided at the locations shown in FIG. 1 of the drawing. The rings prevent acoustic wave transmission between the ring-shaped member 5, the rings 6 and 7 on the one side, and the rod 1, the head 2 and the clamping nut 8 on the otherside, as well as between the rings 6 and 7 and the ring-shaped member 5. The O-rings 10 arranged between the surfaces that are axially loaded by the axial force exerted when screwing the nut 8 firmly on the rod 1, are compressed by this axial load. The O-rings 10 arranged in the grooves 11 that are arranged in the inner walls of the ring-shaped member 5 and of the rings 6 and 7 have an inner diameter that is smaller than the outer diameter of the rod 1 and are deformed when the ring-shaped member 5 and the rings 6 and 7 are slipped on the rod 1. The rings 10 are of a size and of material suitable for preventing or greatly attenuating acoustic wave fronts to enter the ring-shaped member 5 from the other parts of the sensor. Thus, only the wave fronts generated by the impacts of particles on the ring-shaped member 5 will be detected by the transducer element 12.

Figure 4:
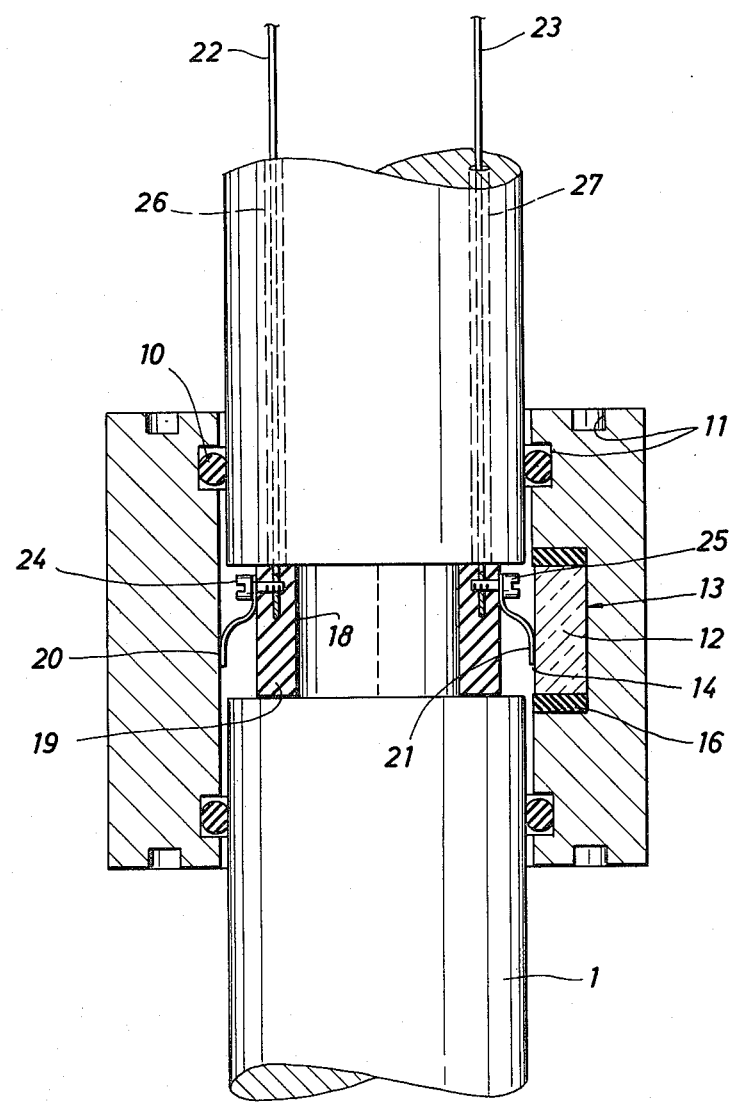
FIG. 4 shows the part A of the section shown in FIG. 1 in greater detail.

The transducer element 12 is arranged on the inner side of the ring-shaped member 5, and reference is now made to FIG. 4 which shows detail A of the sensor of FIG. 1 in greater detail.

The transducer element 12 is formed by a piezo-electric crystal that is housed in a recess 13 in the inner wall of the element 5. The one side of the crystal 12 is glued to the bottom of the recess 13 by means of a glue having electrically conductive properties, whereas the other side has a thin metal plate 14 glued thereto. The crystal is further surrounded by a ring 16 of electrically insulating material.

The rod 1 is provided with a groove 18 facing the piezo-electric crystal 12 of the ring-shaped member 5. A ring-shaped element 19 of electrically insulating material (the member consisting of two halves) is glued in the groove 18 and carries two spring contacts 20 and 21 that are electrically connected to the leads 22 and 23 by the metal screws 24 and 25, respectively. In this manner, electric signals generated by acoustic waves detected by the crystal 12 will be passed via the leads 22 and 23 arranged in the channels 26 and 27, respectively, of the supporting rod 1 to the electric leads (not shown) that are carried by the flexible supporting cable (not shown) cooperating with the eye 3 in the supporting head 2 of the rod 1. The signals are thereby passed onto the surface of the earth in a manner known per se in logging techniques. Prior to transmission the signals may be amplified, filtered or subjected to any other suitable treatment in electronic equipment carried by the supporting head 2 or any other housing arranged between the supporting head 2 and the supporting cable (not shown).

It will be appreciated that since the ring-shaped member 5 is acoustically separated from all of the supporting structure, only those sand grains that impact the member 5 will be detected by the sensor. All other impacts on the sensor will also generate acoustic waves, but these waves will not be transmitted to the ring-shaped member 5 and the transducer means 12. Consequently, the sensor shown in FIG. 1 will not detect sand grains in the fluid flow, which move in a direction that is parallel to the central axis of the sensor. Thus, only those particles will be detected that are carried by a fluid flow passing out of a perforation present in the wall of the casing, which perforation is facing the side wall of the member 5. Thus, by slowly lowering (or lifting) the sensor through the borehole and monitoring the level at which the sensor is suspended (in a manner known per se by measuring the length of the cable supporting the sensor in the borehole) the level of the perforation that is producing sand grains can be easily detected.

It will be appreciated that the application of the ring-shaped member 5 carrying the transducer 12, which member is acoustically separated from the remaining part of the sensor, allows the detection of particles that pass through a "window" of restricted area and impact on the sensor substantially perpendicular to the central axis thereof, without interference of the particles that are passed along the sensor in a sense substantially longitudinal thereto.

In an alternative construction of the sensor shown in FIG. 1, one or both of the rings 6 and 7 may be omitted.

In an alternative application of the sensor of FIG. 1, the sensor can be mounted immovably in a conduit through which a fluid carrying particles is flowing. The sensor is mounted with the central axis thereof substantially perpendicular to the fluid flow. To this end, the head 2 is provided with coupling means instead of with the eye 3, which means is adapted to mount the head in an opening in the wall of the conduit. The place and size of the "window" in which the presence of particles is to be detected depends on the height and diameter of the member 5 and the heights of the rings 6 and 7 respectively.

The sensor according to the invention is also useful for detecting the presence of sand grains in conduits through which sand-laden two-phase fluids flow, such as mixtures of oil and gas flowing from a well to treating equipment. The co-pending application Ser. No. 156847 filed June 5, 1980, now U.S. Pat. No. 4,296,628, describes a technique wherein undesired noise such as noise resulting from the presence of gas bubbles in the flow, can be eliminated by using two metal bodies. Each body cooperating with an acoustic transducer means adapted to detect acoustic energy in the relevant body and to generate electric signals representative of such energy. One of the bodies has at least part of the metal surface thereof covered with a layer of acoustic dampening material, and means are provided for subtracting one of the electric signals from the other signal, whereafter the resulting signal is displayed and/or recorded.

The two metal bodies each cooperating with an acoustic transducer that are required in the above referred method for detecting particles in a two-phase flow may be constituted by applying two sensors of the type shown in FIG. 1. The outer wall of the ring-shaped member 5 of one of the sensors is then covered by an acoustic dampening layer, while the electric signals generated by the piezo-electric elements 11 are processed by subtracting one of the signals from the other.

Figure 2:
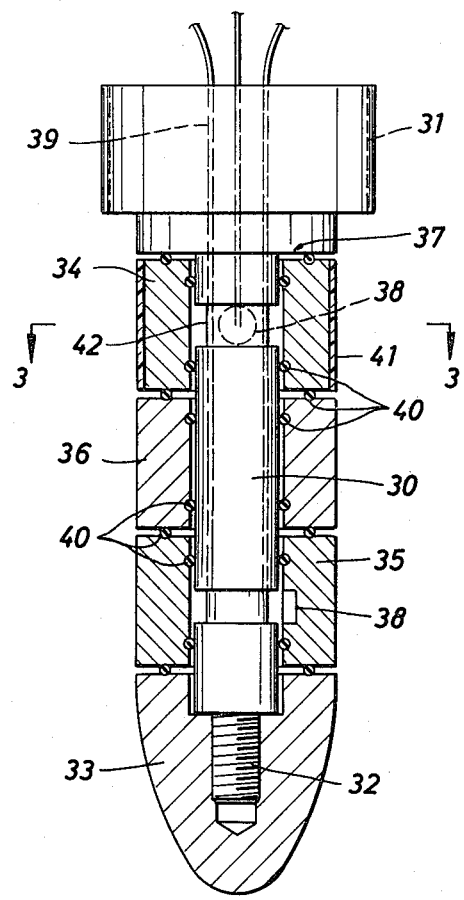
FIG. 2 shows a longitudinal section of a sensor adapted to be placed in a fluid flow passing through a pipe or conduit.

In an alternative arrangement, however, the two metal bodies may be mounted in a common sensor. For this purpose, use can be made of the sensor according to the present invention. FIG. 2 of the drawing shows a longitudinal section of such sensor by way of example.

The supporting rod 30 of the sensor shown in FIG. 2 is provided with a screwthread 31 at the upper end thereof, this screwthread being suitable for cooperation with a screwthreaded opening in the wall of a conduit (not shown) through which a fluid flow to be monitored is passing.

The lower end of the rod 30 is provided with a screwthread 32 cooperating with a screwthread in the streamlined nut 33. Two metal ring-shaped members 34 and 35 having a ring 36 arranged therebetween are clamped between the nut 33 and the annular shoulder 37 of the rod 30. The members 34 and 35 are metal rings each carrying a piezo-electric crystal 38 in the same manner as has been described hereinabove with reference to FIG. 4 of the drawing. Electric leads 39 pass through the supporting rod 30 for transmitting electric signals from the crystals 38 to suitable measuring and/or recording equipment (not shown).

The ring-shaped members 34 and 35 and the ring 36 are acoustically separated from each other and from the supporting rod 30 by means of O-rings 40 of elastic material.

The upper ring-shaped member 34 is provided with a layer 41 of acoustic dampening material on the outer wall thereof.

Figure 3:
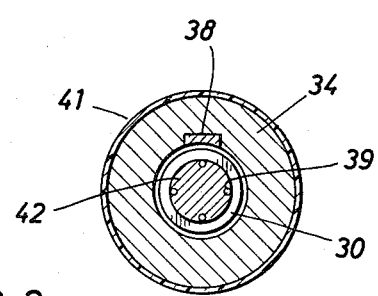
FIG. 3 shows a cross section of the sensor of FIG. 2 taken in the direction III—III.

FIG. 3 of the drawing shows a cross-section of the sensor of FIG. 3 taken over the section III—III thereof through the upper ring-shaped member 34 and the groove 42 in the supporting rod 30 which groove faces the piezo-electric element 38 that is supported in a recess of the member 34 in the same manner as shown in FIG. 4 with respect to the groove 18 facing the piezo-electric element 12.

The transducer 38 (see FIG. 2) cooperating with the ring-shaped member 35 will detect acoustic waves in said member, which waves originate from gas bubbles present in a two-phase fluid flow passing along the sensor, as well as from the impacts on the member 35 made by particles present in such flow.

The transducer 38 of the ring-shaped member 34, however, will only detect acoustic waves originating from the gas bubbles since the acoustic dampening layer 41 present on the outer wall of the member 34 dampens the impacts of the particles.

By subtracting the signals generated by the two transducers one from another, the resulting signal will be substantially representative for the acoustic waves generated by the impacts of the particles.

In an alternative construction of the sensor of FIG. 2, the ring 36 may be omitted. In still another alternative construction, further rings 36 may be placed between the shoulder 37 and the ring-shaped member 34, as well as between the ring-shaped member 38 and the nut 33.

The sensor shown in FIG. 2 on being positioned in a conduit (not shown) through which a two-phase flow to be monitored is being passed, is preferably mounted in a plane of symmetry of the conduit. Such plane may be vertical, but good results may also be obtained in certain situations by a horizontal plane of symmetry.

The signals generated by the acoustic transducers may be amplified, filtered and/or subjected to other treatments that are typical for signal transmission and recording techniques.

The acoustic transducers may cooperate with the ring-shaped members 5, 34 and 35 in any desired manner. Piezo-electric elements are preferred, although other means may be used as well. The elements may be clamped by springs or screws onto the bodies, or be glued thereto.

It will be appreciated that the ring-shaped members such as the members 5, 34 and 35 of the sensors according to the invention should have excellent acoustic wave transmittal properties, and that these members are therefore made of metal. The rings adjoining the ring-shaped members, such as the rings 6, 7 and 36, may be made of metal or of any other material suitable for this purpose. It is irrelevant whether the material of these rings has good wave-transmittal properties or not, since these rings are acoustically separated from the other parts of the sensor by means of material having elastic properties.

Any suitable means for mounting the ring-shaped members 5, and 34, 35 and the rods 1 and 30, respectively, such that the electric contacts (such as contact 21 in FIG. 4) cooperates with the relevant piezo-electric crystal, may be used for this purpose.

The spaces between the rod of the sensor and the other parts thereof are filled with air, or any other gas suitable for the purpose.

Tests have shown that the volume of the elastic material between the various parts of the sensor according to the invention should be as small as possible in order to attenuate the passage of acoustic waves between these parts to a sufficient extent. O-rings as shown in the drawing are very attractive for this purpose, although annular members of other cross-sections may be used as well.

The invention is not restricted with respect to the number and/or the dimensions of the ring-shaped members carrying transducer means, or with respect to the number and/or dimensions of the rings arranged between the ring-shaped members or arranged between these members and the other parts of the sensor. Thus, further rings 36 (see FIG. 2) may be placed between the upper ring-shaped member 34 and the shoulder 37 of the rod 30, and between the lower ring-shaped member 35 and the nut 33. The required O-rings (or any other type of rings of elastic material) are arranged between these further rings and the parts of the sensor adjoining these further rings.

Finally, it is observed that further logging tools or other equipment may be suspended from the sensor shown in FIG. 1 by removing the nut 8 therefrom and coupling the screwthread 9 with a screwthreaded opening arranged in the head of such further logging tool. This further tool should be mounted on the screwthread 9 in such a manner that the rings 6 and 7 and the ring-shaped member 5 are clamped against the shoulder 4 of the head 2. The rod 1 may be provided with one or more longitudinal channels (not shown) that are adapted for passing electrical leads therethrough to pass signals that originate from said further logging tools. If desired, the eye 3 may be replaced by any other type of coupling means (such as a screwthread) adapted to couple the head 2 to a cable or to the lower end of another logging tool.

What is claimed is:

1. A sensor for detecting particles in a fluid flow, including:
   at least one metal ring-shaped member supporting transducer means in acoustic wave contact therewith;
   a rod provided with a shoulder;
   clamping means for clamping the ring-shaped member on the rod by exerting an axial force on the rod and the member; and
   material having elastic properties arranged between the ring-shaped member and the rod, and between the ring-shaped member and the surfaces by which the clamping force is exerted on the ring-shaped member.

2. The sensor according to claim 1, comprising two metal ring-shaped members, each member supporting transducer means in acoustic wave contact therewith, a ring arranged between the ring-shaped members, and material having elastic properties being arranged between the ring-shaped members and the ring, as well as between the rod and the ring and ring-shaped member.

3. The sensor according to claim 1 or 2, wherein at least one ring-shaped member supporting a transducer means is arranged between two rings, and material having elastic properties is arranged between the ring-shaped members and the rings, as well as between the rod and the rings and ring-shaped member.

4. The sensor according to claim 1 or 2, wherein at least one ring-shaped member has a recess in the inner wall thereof, wherein a transducer element in the form of a piezo-electric crystal is supported.

5. The sensor according to claim 4, wherein one side of the crystal cooperates with an electric contact carried by the rod.

6. The sensor according to claim 5, wherein the contact is mounted in a groove arranged in the outer surface of the rod.

* * * * *